United States Patent
Chang (10) Patent No.: US 6,386,558 B1
(45) Date of Patent: May 14, 2002

(54) HANDCART WITH FOLDABLE WHEELS

(76) Inventor: Chin-Lin Chang, No. 636, Yuan-Huan E. Rd., Feng-Yuan City, Taichung Hsien (TW)

(*) Notice: Subject to any disclaimer, the term of this patent is extended or adjusted under 35 U.S.C. 154(b) by 0 days.

(21) Appl. No.: 09/899,596

(22) Filed: Jul. 5, 2001

(51) Int. Cl.[7] .................................................. B62B 1/12
(52) U.S. Cl. ...................... 280/40; 280/655; 280/47.27; 280/47.371
(58) Field of Search .............................. 280/42, 39, 40, 280/651, 652, 654, 655, 47.24, 47.26, 47.27, 47.371, 47.34, 43

(56) References Cited

U.S. PATENT DOCUMENTS

| | | | | |
|---|---|---|---|---|
| 3,489,426 A | * | 1/1970 | Bond | 280/42 |
| 3,620,546 A | * | 11/1971 | Anderson | 280/42 |
| 4,087,102 A | * | 5/1978 | Sprague | 280/40 |
| 5,127,662 A | * | 7/1992 | Spak | 280/40 |
| 6,053,514 A | * | 4/2000 | Su | 280/40 |

* cited by examiner

Primary Examiner—Michael Mar
(74) Attorney, Agent, or Firm—Jackson Walker L.L.P.

(57) ABSTRACT

A handcart has a base frame, a handle assembly, two wheel brackets, multiple wheels and two levers. The handle assembly is retractably connected to the base frame. Each wheel bracket is pivotally attached to one side of the base frame with a pivot pin. At least one of the wheels is rotatably mounted on each wheel bracket. One end of each lever is pivotally connected to each pivot pin, and another end is operationally connected to the handle assembly. Accordingly, the wheel brackets with the wheels will be automatically retracted or expanded through transmissions of the levers when the handle assembly is moved to an expanded position or a retracted position. The size of an object with the handcart can be minimized. In addition, getting the indoors dirty is avoided.

11 Claims, 9 Drawing Sheets

HANDCART WITH FOLDABLE WHEELS

BACKGROUND OF THE INVENTION

1. Field of the Invention

The present invention relates to a handcart, and more particularly to a handcart with foldable wheels wherein wheel brackets on the handcart can be automatically folded as a handle assembly attached to the handcart is retracted.

2. Description of Related Art

To reduce the effort required to move or transport an object, wheels are often attached to the object so the object can be easily pulled or pushed. For example, two or four wheels are often mounted on the bottom of a suitcase or a handcart. A handle is mounted on the suitcase or the handcart, such that the suitcase or handcart can be easily pulled or pushed. In addition, the handle of the suitcase or the handcart can be folded or retracted to reduce the size of the suitcase or the handcart. However, the wheels cannot be folded or retracted relative to the suitcase or the handcart. The size of the suitcase and the handcart cannot be further reduced. Usually, the wheels are very dirty because the wheels are in contact with sidewalks, the ground, etc. Consequently, the wheels easily make indoor floors dirty.

Additionally, golf is a popular sport worldwide. A golf bag is always used to carry golf clubs. However, because conventional golf bags only have a strap to carry the bag but no wheels, much effort is required to carry a golf bag with multiple golf clubs.

To overcome the shortcomings, the present invention provides a handcart with foldable wheels to mitigate or obviate the aforementioned problems.

SUMMARY OF THE INVENTION

The main objective of the invention is to provide a handcart where wheel brackets with a wheel in each wheel bracket can be automatically folded or expanded when a handle assembly on the handcart is retracted or expanded. The handcart has a base frame, a handle assembly, at least two wheel brackets, multiple wheels and two levers. The handle assembly is retractably attached to the base frame. Each wheel bracket is pivotally attached to one side of the base frame with a pivot pin. At least one wheel is rotatably mounted in each wheel bracket. One end of each lever is pivotally connected to the corresponding pivot pin, and the other end is pivotally connected to the handle assembly. With such an arrangement, the wheel brackets will pivot relative to the base frame through transmission of the levers when the handle assembly is moved to an expanded position or a retracted position. The wheel brackets with the wheels are automatically retracted or expanded as the handle assembly is moved. The size of an object and the handcart can be minimized. In addition, making an indoor floor dirty can be avoided.

Other objects, advantages and novel features of the invention will become more apparent from the following detailed description when taken in conjunction with the accompanying drawings.

DETAILED DESCRIPTION OF PREFERRED EMBODIMENT

Figure 1:
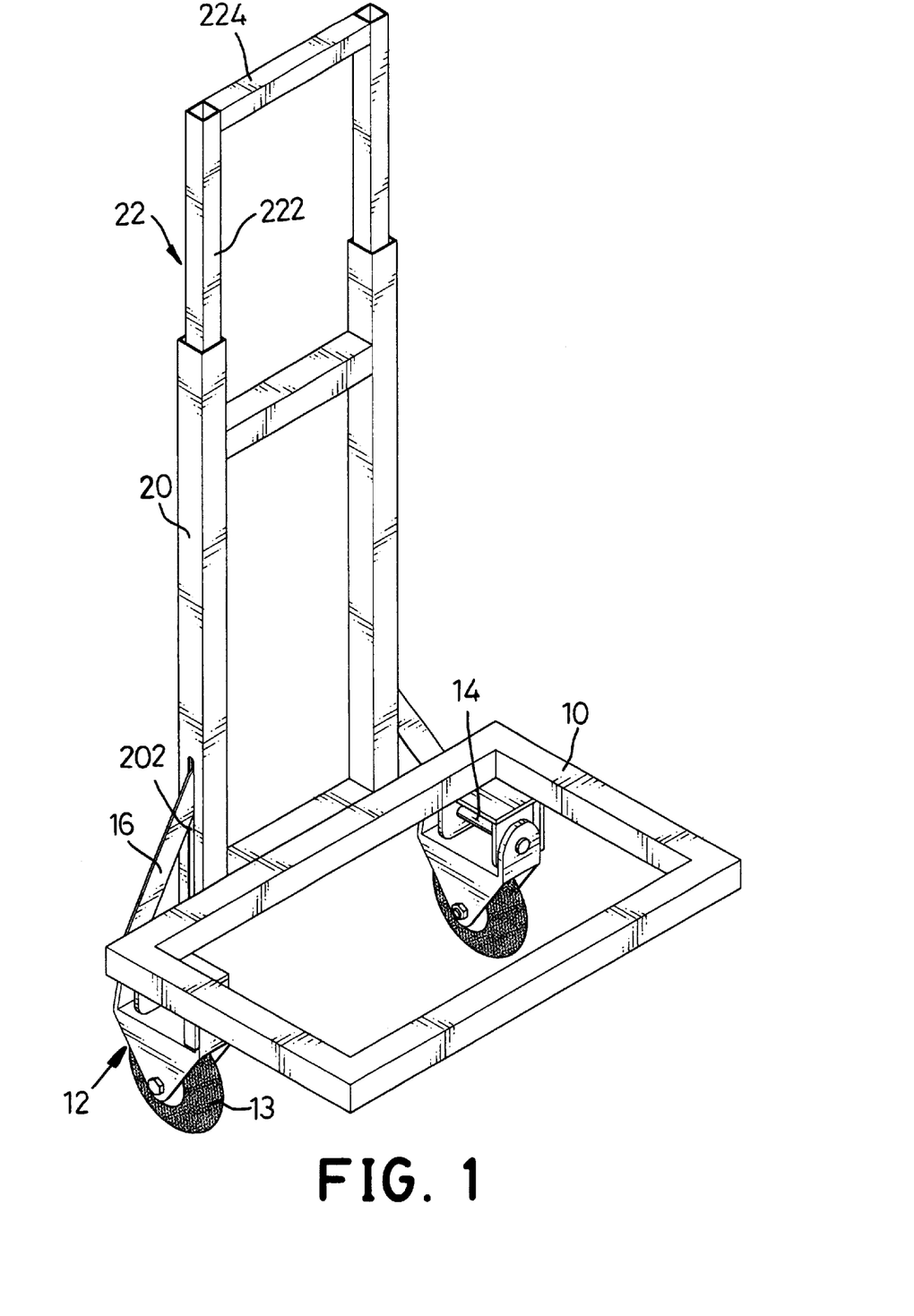
FIG. 1 is a perspective view of a handcart in accordance with the present invention.
Figure 2:
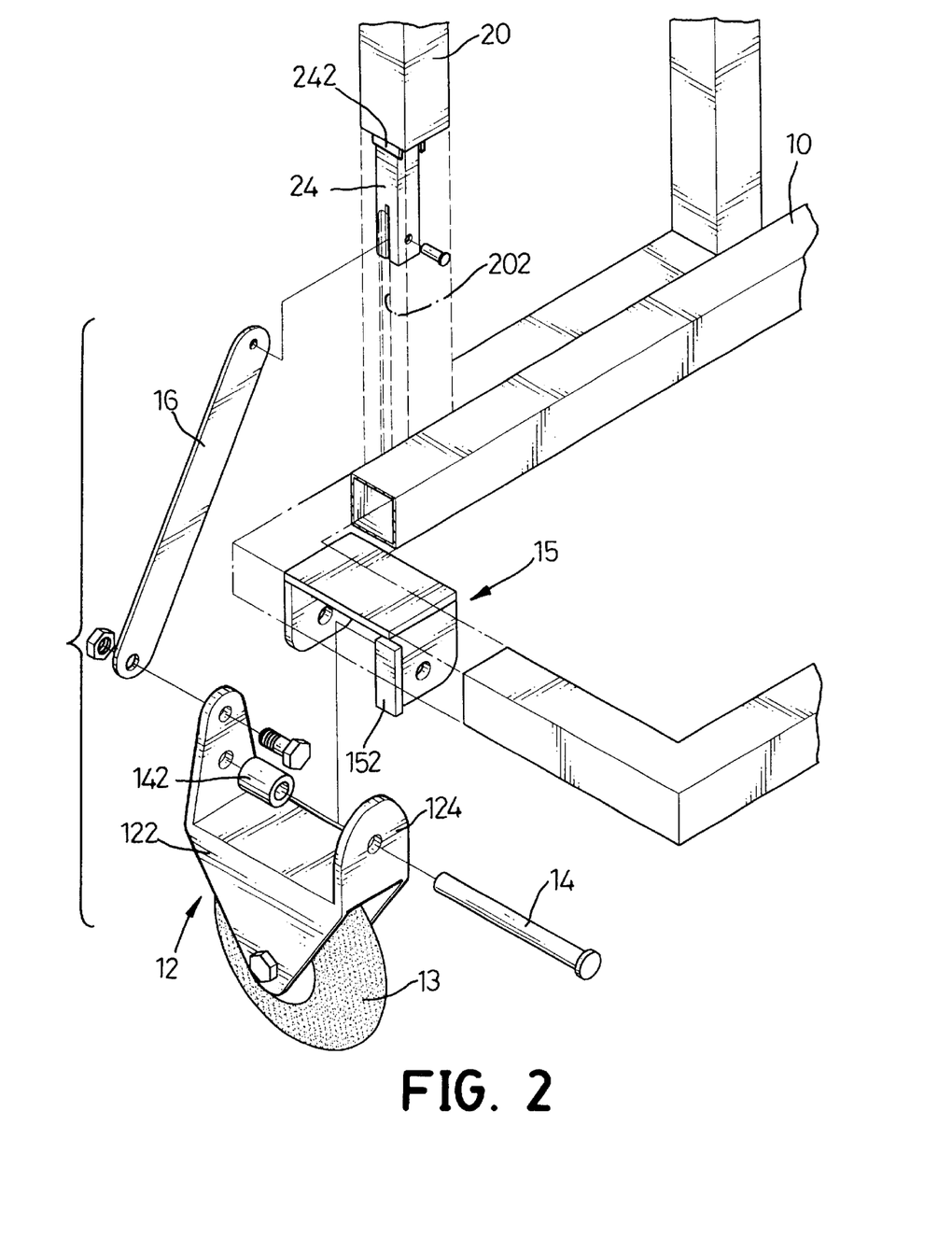
FIG. 2 is an enlarged exploded perspective view of the wheel assembly of the handcart in FIG. 1.
Figure 3:
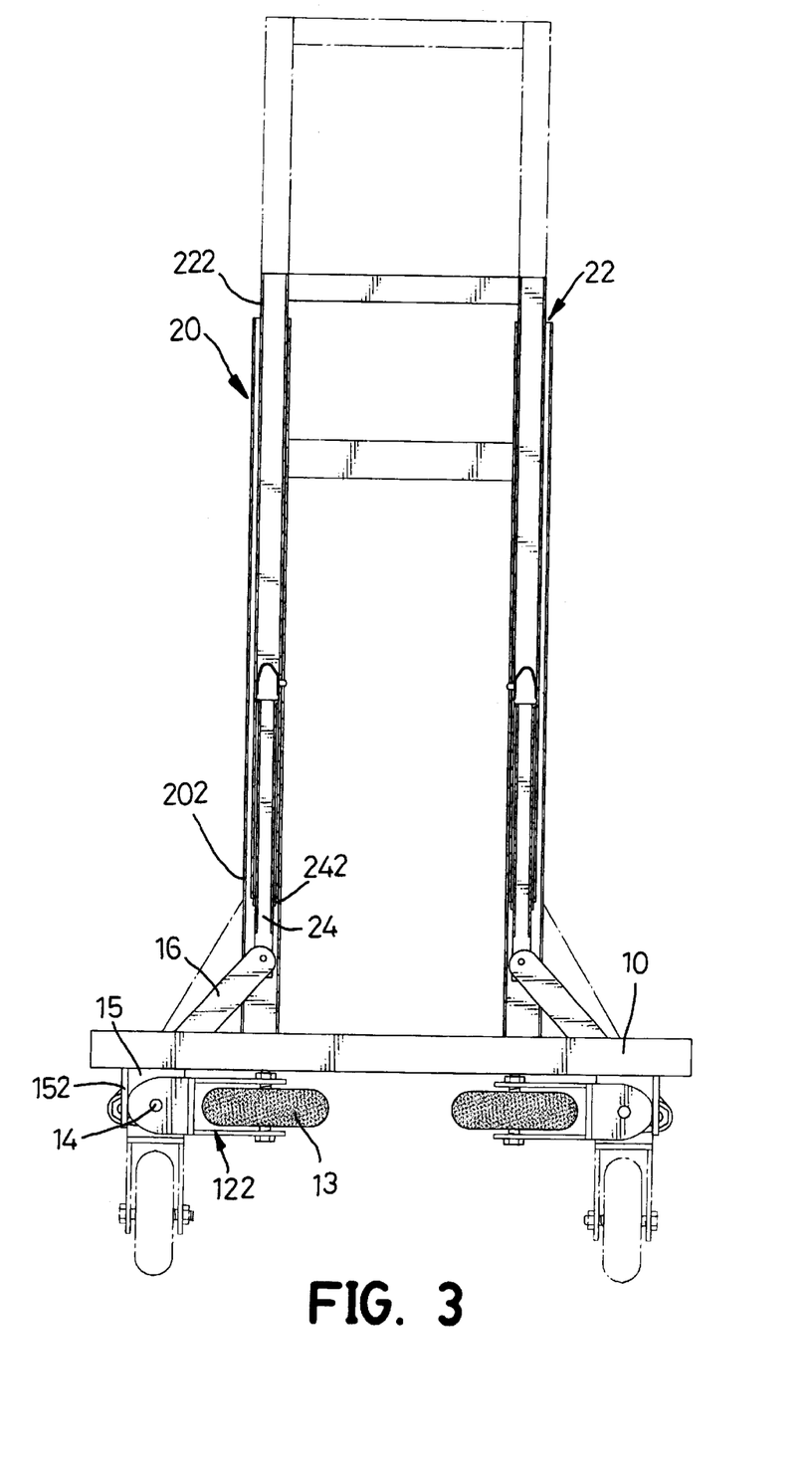
FIG. 3 is an operational front plan view in partial section of the handcart in FIG. 1.

With reference to FIGS. 1 to 3, a handcart in accordance with the present invention comprises a base frame (10), a retractable handle assembly, at least two wheel brackets (12), multiple wheels (13) and two levers (16). The base frame (10) has a front, back and two sides. The retractable handle assembly is mounted on the base frame (10).

The retractable handle assembly has two outer tubes (20) and a handle (22). Each outer tube (20) is mounted parallel to the other on the back of the base frame (10) near the sides. A slot (202) is longitudinally defined in each outer tube (20). The handle (22) is slidably mounted in the outer tubes (20). The handle (22) is comprised of two sliding tubes (222) and a handgrip (224). Each sliding tube (222) is slidably inserted into one of the outer tubes (20). The handgrip (224) is mounted between the tops of the sliding tubes (222). A first positioning device (not numbered) is mounted on each sliding tube (222) to position the sliding tube (222) relative to the corresponding outer tube (20). In practice, the first positioning device is a biasing member with a button. A through hole (not numbered) is defined in each sliding tube (222) for the button of the biasing member to extend through the hole. Two bores are defined in each outer tube and are separated from each other. When the button extends into the one of the bores in the outer tube (20), the sliding tube (222) will be positioned relative to the outer tube (20).

An inner tube (24) is slidably received in each sliding tube (222). The bottom end of each inner tube (24) extends out from the bottom of the corresponding sliding tube (222). A second positioning device is arranged between each inner tube (24) and the sliding tube (222) to position the inner tube (24) to the corresponding sliding tube (222). In practice, the second positioning device includes a shoulder (not numbered) laterally extending outward around the top of each inner tube (24), and a flange extending inward around the bottom of each sliding tube (222). When the sliding tube (222) moves upward and the flange abuts the shoulder on the inner tube (24), the inner tube (24) will move upward with the sliding tube (222) by means of the abutment between the flange and the shoulder. The inner tube (24) will be positioned relative to the sliding tube (222) as the first positioning device is engaged. In addition, a stop (242) is attached on each inner tube (24) and has a length longer than a width of the inner tube, such that each stop (242) has at least one end extending out from one side of the inner tube (24). Accordingly, when the sliding tube (222) moves downward and the bottom of the sliding tube (222) abuts the stop (242), the inner tube (24) will move downward with the sliding tube (222).

Each wheel bracket (12) is pivotally attached to a pivot bracket (15) with a pivot pin (14). Each pivot bracket (15) is attached to one side of the base frame (10). A wheel (13) is rotatably mounted in each wheel bracket (12). Each pivot bracket (15) is substantially inverse U-shaped and has two ends extending downward from the pivot bracket (15). Each wheel bracket (12) is composed of a frame (122) and two ears (124). The wheel (13) is rotatably mounted in the frame (122). Each ear (124) extends upward from one end of the frame (122). The pivot pin (14) extends through the ends of the pivot bracket (15) and the ears (124) of the wheel bracket (12), such that the wheel bracket (12) is pivotally mounted on the pivot bracket (15) with the pivot pin (14). In addition, a limit tab (152) laterally extends from one end of each pivot bracket (15) and corresponds to one of the ears (124) of the wheel bracket (12). The limit tab (152) will stop the wheel bracket (12) from pivoting outward as the corresponding ear (124) abuts the limit tab (152). A sleeve (142) mounted on each pivot pin (14) and has two ends with one end abutting the ear (124) closest to the lever (16) and the other end abutting the pivot bracket (15) to ensure the ear (124) always aligns with the limit tab (152). A gap is defined between the ear (124) and the end of the pivot bracket (15).

Each lever (16) has two ends. One end is pivotally connected to one of the wheel brackets (12), and the other end extends through the slot (202) in the corresponding outer tube (20) and is pivotally connected to the corresponding inner tube (24). The lever (16) is pivotally connected to the wheel bracket (12) with a pivotal connector such as a bolt, rivet, etc., which is received in the gap between the ear (124) of the wheel bracket (12) and the end of the pivot bracket (15).

Figure 4:
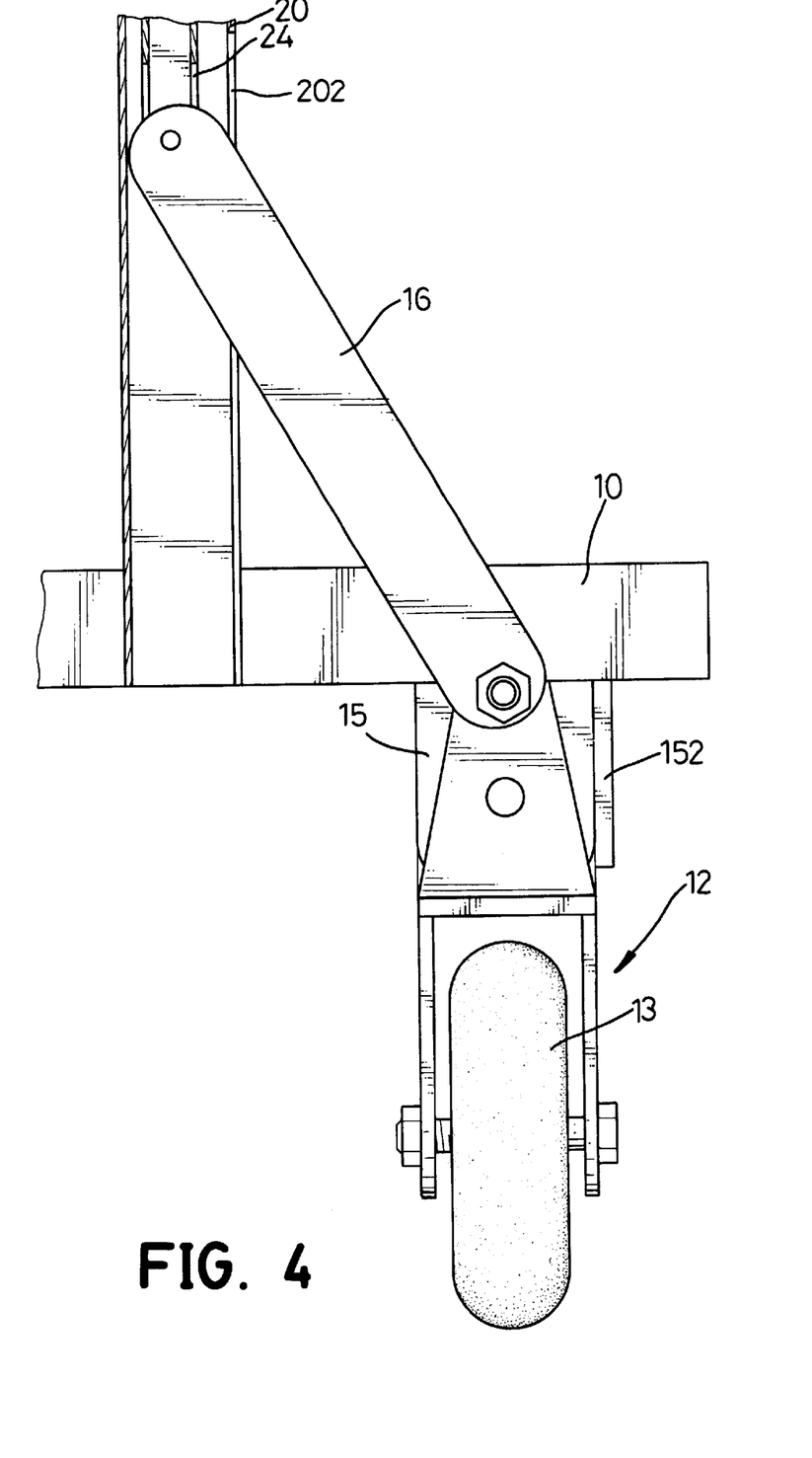
FIG. 4 is an enlarged rear plan view in partial section of one of the wheel assemblies of the handcart in FIG. 1 with the wheel bracket is in an expanded position.

With reference to FIGS. 2 to 4, when the handle (22) is expanded relative to the outer tubes (20), the sliding tubes (222) move upward relative to the outer tubes (20). The inner tubes (24) will move upward with the sliding tubes (222) when the second positioning device is engaged. The levers (16) will move upward with the inner tube (24), and the wheel brackets (12) will pivot relative to the pivot bracket (15) through transmission of the levers (16). Each wheel bracket (12) is stopped in a desired position as the ear (124) abuts the limit tab (152) on the pivot bracket (15). When the sliding tubes (222) move to a position where the first positioning device between the sliding tube (222) and the outer tube (20) is engaged, the handle assembly is positioned in an expanded position. Each wheel bracket (12) is also in a position to roll on the wheels (13). Consequently, the wheel brackets (12) can be automatically expanded to a position to use the wheels (13) as the handle (22) is pulled to an expanded position. The user can pull or push the handcart with much less effort.

Figure 5:
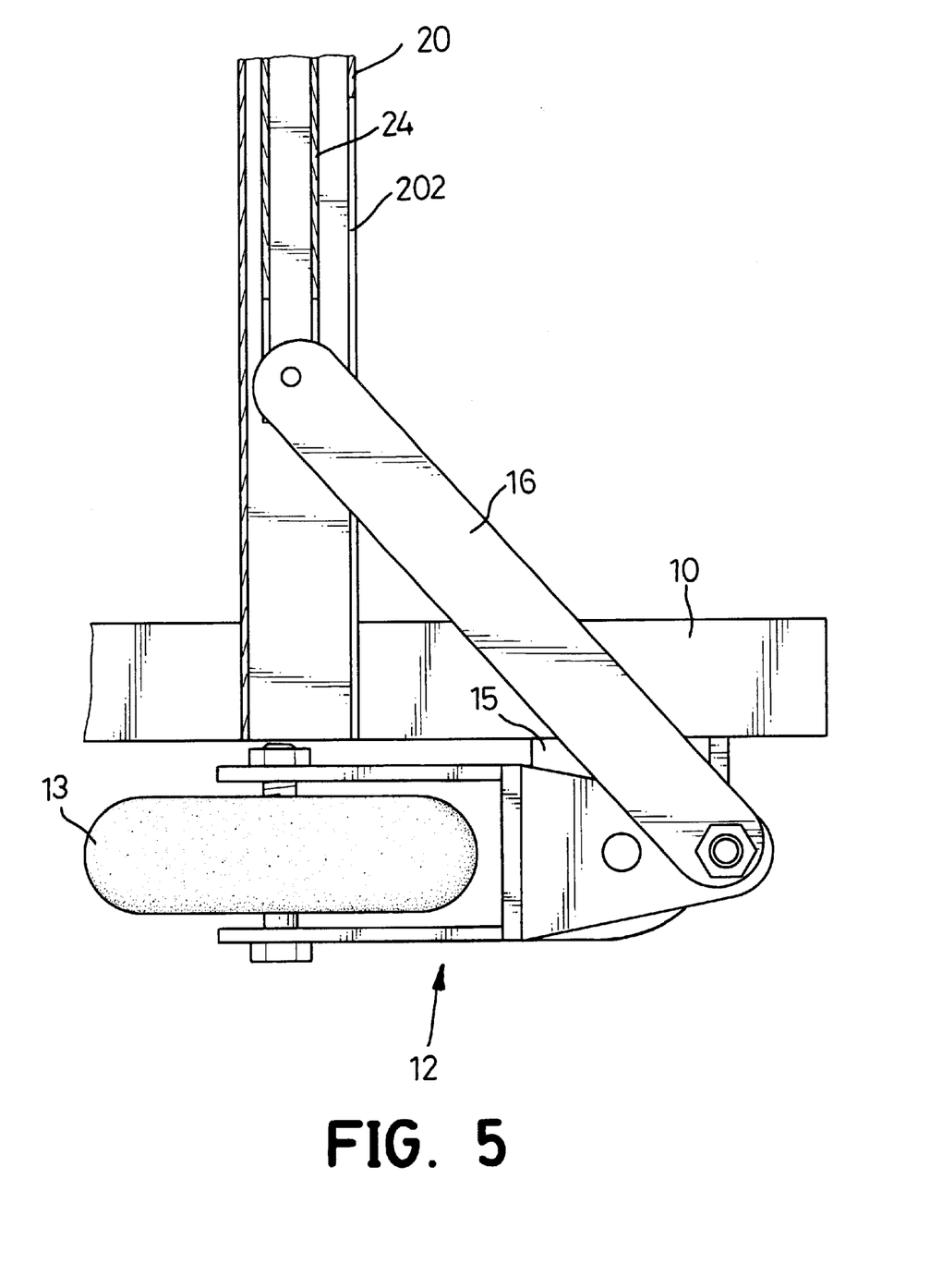
FIG. 5 is an enlarged rear plan view in partial section of one of the wheel assemblies of the handcart in FIG. 1 with the wheel bracket is in a retracted position.

With reference to FIGS. 2, 3 and 5, when the first positioning device is released and the handle (22) is retracted relative to the outer tubes (20), the sliding tubes (222) move downward relative to the outer tubes (20). The inner tubes (24) will move upward with the sliding tubes (222) when the bottoms of the sliding tubes (222) abut the stops (242) on the inner tubes (24). The levers (16) will move downward with the inner tubes (24), and the wheel brackets (12) will pivot relative to the pivot bracket (15) through the transmission of the levers (16). Consequently, the wheel brackets (12) will rotate to a folded position as the handle (22) is retracted. The wheel brackets (12) with the wheels (13) can be automatically folded as the handle assembly is retracted. The size of the handcart is minimized. To transport and to store the handcart become more convenient.

Figure 6:
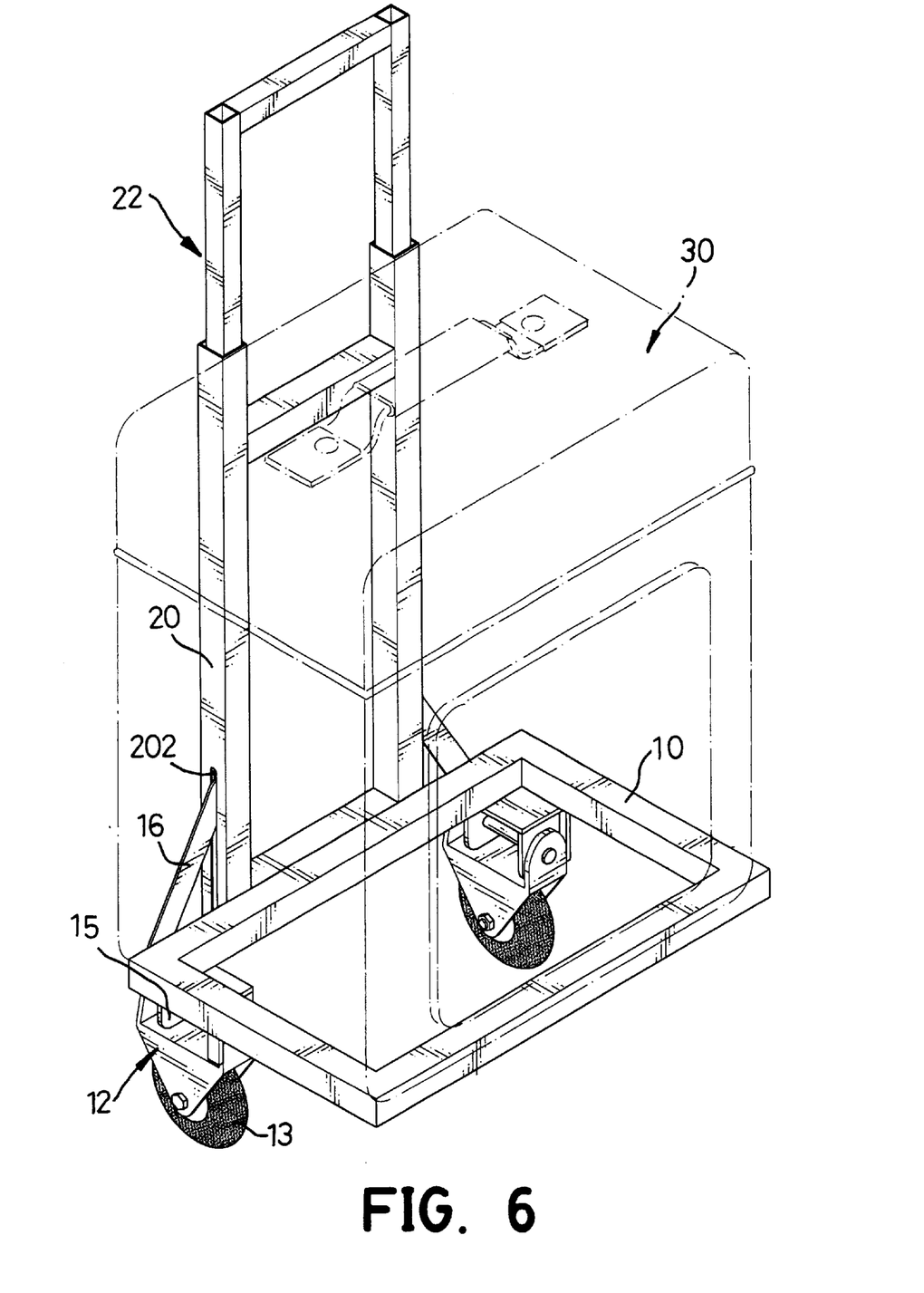
FIG. 6 is an operational perspective view of the handcart in FIG. 1 with a suitcase.
Figure 7:
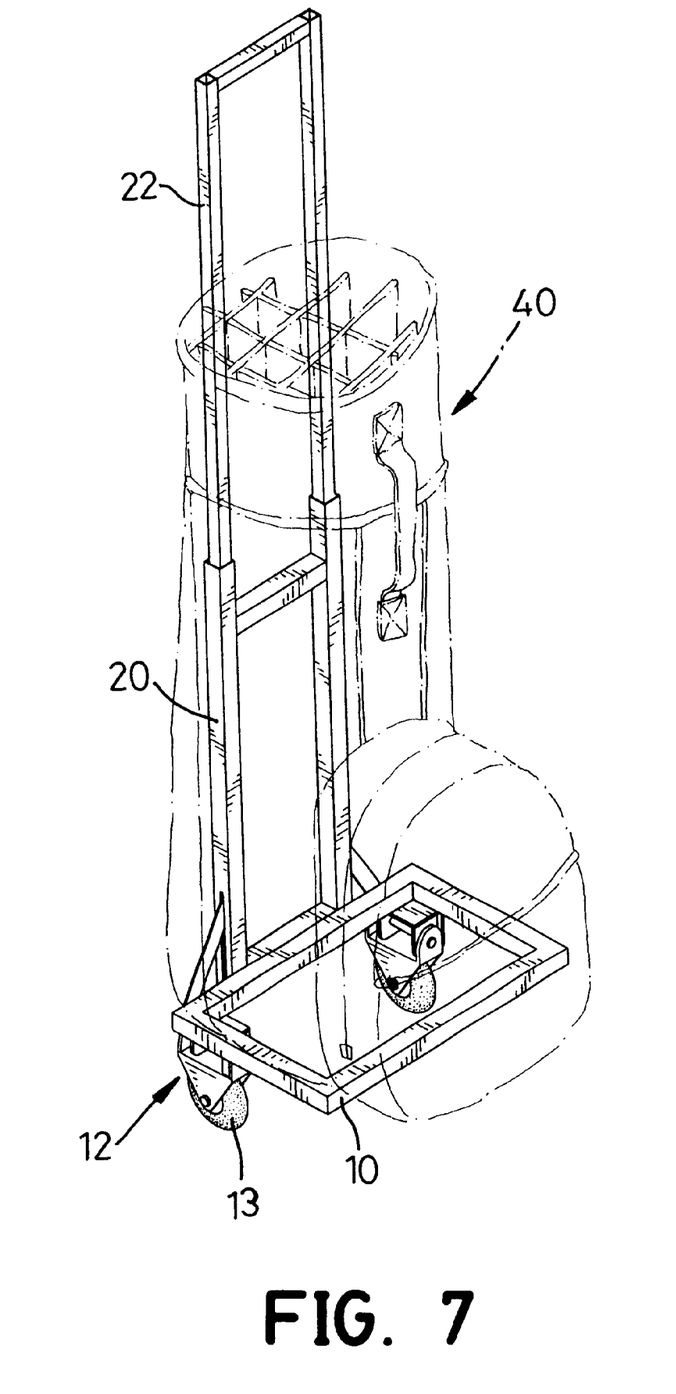
FIG. 7 is an operational perspective view of the handcart in FIG. 1 with a golf bag.

With reference to FIGS. 6 and 7, the handcart in accordance with the present invention can be attached to a suitcase (30) or a golf bag (40). Accordingly, the suitcase (30) or the golf bag (40) with the handcart can be pulled or pushed thereby reducing the effort required to transport the load. Because the wheel brackets (12) on the handcart attached to the suitcase (30) or the golf bag (40) can be automatically folded as the handle assembly is retracted, the storage space required for the suitcase (30) or the golf bag (40) is minimized. The dirty wheels (13) on the folded wheel brackets (12) will not dirty the indoor.

Figure 8:
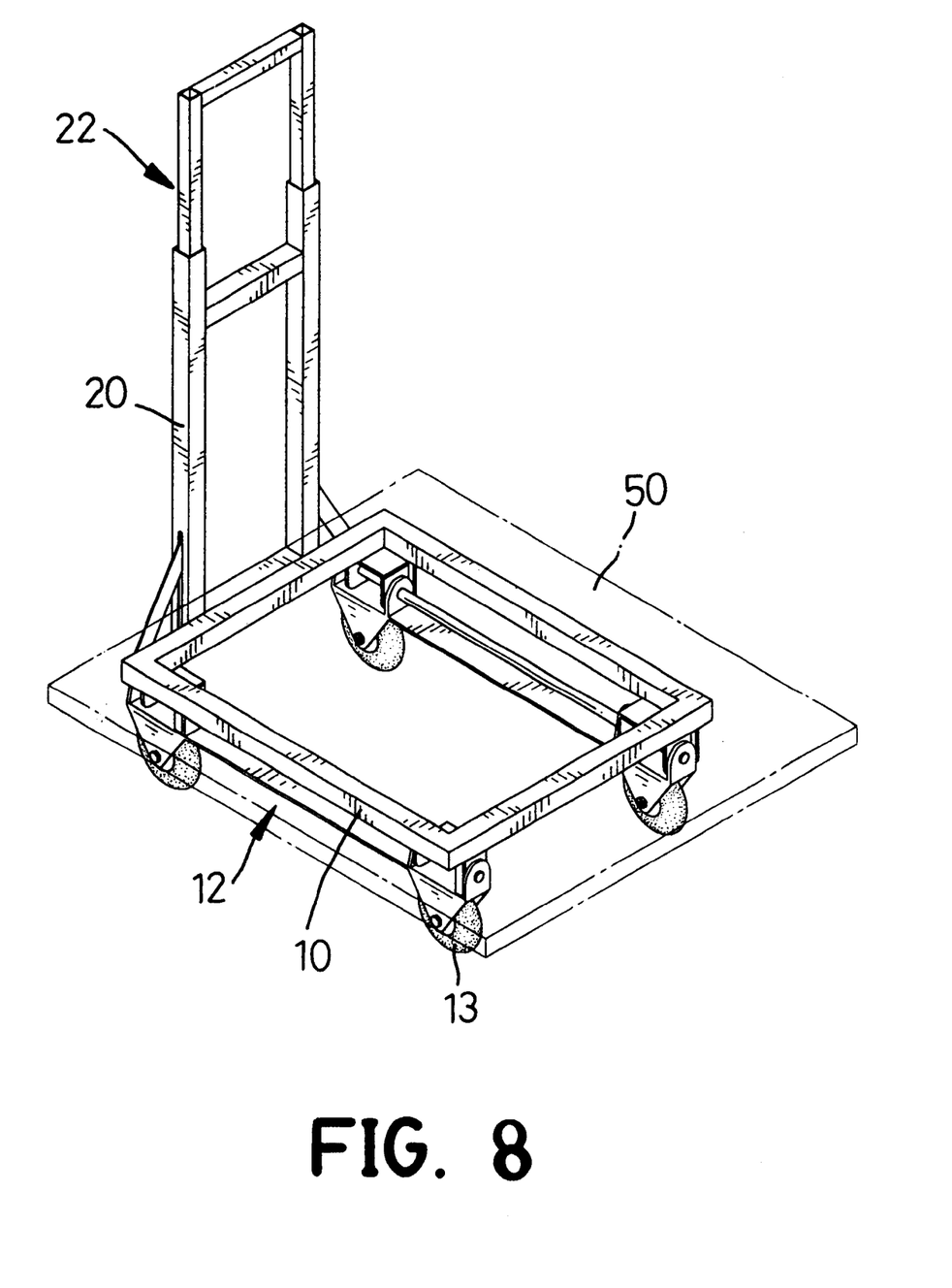
FIG. 8 is an operational perspective view of another embodiment of a handcart in accordance with the present invention with a board on the handcart.
Figure 9:
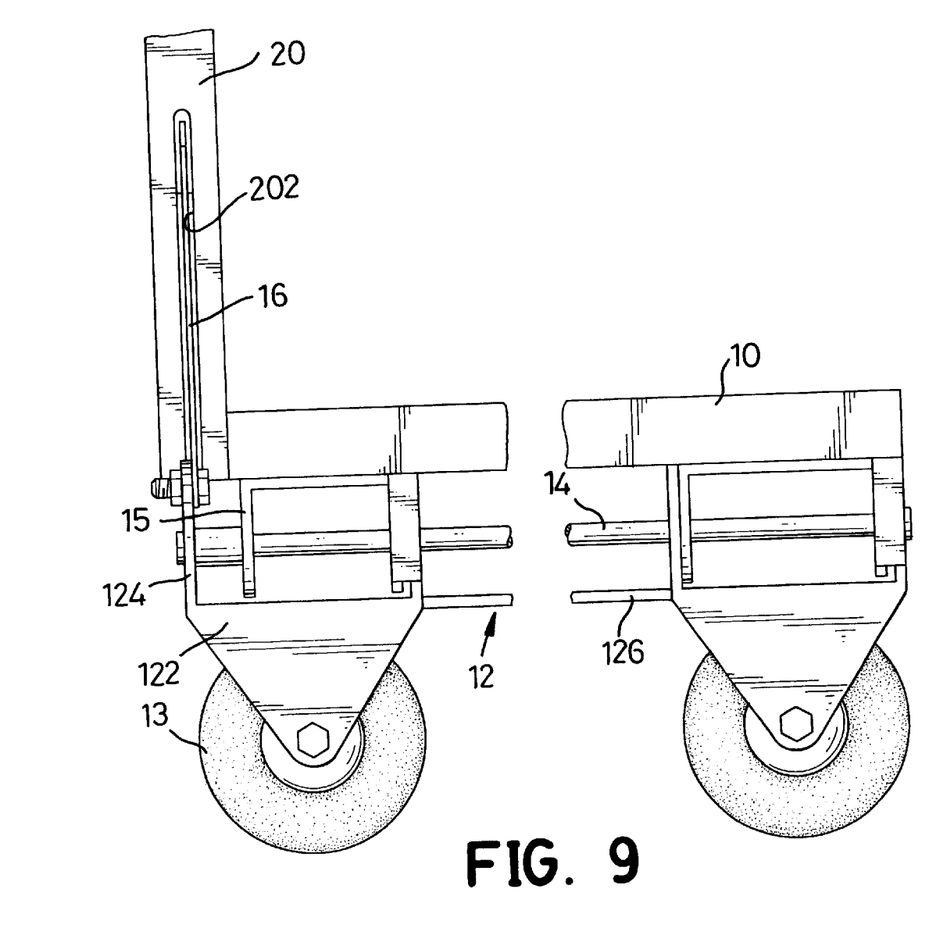
FIG. 9 is a side plan view of the handcart in FIG. 8 without the board.

In another embodiment, with reference to FIGS. 8 and 9, there are two wheels (13) rotatably mounted on each wheel bracket (12). Two pivot brackets (15) are secured to the base frame (10) to pivotally mount each wheel bracket (12) on the pivot brackets (15) in cooperation. Each wheel bracket (12) is composed of two frames (122), four ears (124) and a connecting plate (126). Each frame (122) corresponds to one of the pivot brackets (16) for rotatably mounting one of the wheels (13). Two ears (124) respectively extend upward from opposite ends of each frame (122). The connecting plate (126) is connected between the frames (122). Each pivot pin (14) extends through the ends of each pivot bracket (15) and all of the ears (124) of the wheel bracket (12) so as to pivotally mount the wheel bracket (12) with two wheels (13) to the pivot brackets (15) with the pivot pin (14).

Accordingly, a board (50) can be attached to the base frame (10), such that the handcart with the board (50) will become a handcart or dolly. When the handle assembly is expanded, each wheel bracket (12) with two wheels (13) will rotate relative to the base frame (10) to an expanded position. When the handle assembly is retracted, each wheel bracket (12) with wheels (13) will rotate relative to the base frame (10) to a folded position. The size of the handcart is reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A handcart comprising:
   a base frame;
   a handle assembly retractably attached to the base frame;
   a wheel bracket pivotally attached to each side of the base frame with a pivot pin;
   at least one wheel rotatably mounted on each wheel bracket;
   a lever with one end pivotally connected to each wheel bracket and another end operationally connected to the handle assembly;
   wherein the handle assembly has:
   two outer tubes respectively mounted on one side of the base frame and parallel to each other;
   a slot longitudinally defined in each outer tube for the corresponding one of the levers to extend through the slot; and
   a handle slidably mounted on the outer tube for the corresponding one of the levers to extend through the slot; and
   a handle slidably mounted on the outer tubes and having:

a sliding tube slidably inserted into each outer tube and operationally connected to each lever:

a handgrip mounted on tops of the sliding tubes; and a first means to hold each sliding tube in position relative to the corresponding outer tube, whereby the wheel brackets pivot relative to the base frame through transmission of the lever when the handle assembly is moved to an expanded position or a retracted position.

2. The handcart as claimed in claim 1, wherein an inner tube is slidably received in each sliding tube and has a bottom end extending out from a bottom of the corresponding one of the sliding tubes to pivotally connect to a corresponding one of the levers; and a second means to hold each inner tube in position relative to a corresponding one of the sliding tubes.

3. The handcart as claimed in claim 2, wherein a stop is attached to each inner tube and has a length longer than a width of the inner tube so that the stop has at least one end extending out from one side of the inner tube, whereby the inner tube moves downward with the corresponding one of the sliding tubes when the handle assembly is retracted and the sliding tube abuts the stop.

4. The handcart as claimed in claim 1, wherein one wheel is rotatably mounted on each wheel bracket;

a pivot bracket is attached to the base frame to pivotally attach each wheel bracket to the pivot bracket.

5. The handcart as claimed in claim 4, wherein each pivot bracket is substantially inverse U-shaped and has two ends extending downward from the pivot bracket; and each wheel bracket has:

a frame for rotatably mounting the corresponding one of the wheels on the frame; and an ear extending upward from each end of the frame, wherein each pivot pin extends through the ends of one of the pivot brackets and the ears of the corresponding one of the wheel brackets so as to pivotally attach each wheel bracket to one of the pivot brackets with the pivot pin.

6. The handcart as claimed in claim 5, wherein a limit tab laterally extends from one end of each pivot bracket and corresponds to one of the ears of the corresponding one of the wheel brackets so as to stop the wheel bracket as the corresponding ear abuts the limit tab.

7. The handcart as claimed in claim 5, wherein a sleeve is mounted on each pivot pin and has two ends each abutting the ear closest to the lever and one end of the pivot bracket so as to separate the ear from the end of the pivot bracket.

8. The handcart as claimed in claim 1, wherein two wheels are rotatably mounted on each wheel bracket;

two pivot brackets are secured to the base frame to pivotally attach each wheel bracket to the pivot brackets in cooperation.

9. The handcart as claimed in claim 8, wherein each pivot bracket is substantially inverse U-shaped and has two ends extending downward from each pivot bracket; and each wheel bracket has:

two frames for rotatably mounting one of the wheels on each frame and corresponding to one of the pivot brackets;

two ears respectively extending upward from opposite ends of each frame; and a connecting plate connected between the frames;

wherein each pivot pin extends through the ends of each pivot bracket and all of the ears of the wheel bracket so as to pivotally attach the wheel bracket with two wheels to the pivot brackets with the pivot pin.

10. The handcart as claimed in claim 9, wherein a limit tab laterally extends from one end of each pivot bracket and corresponds to one of the ears of the corresponding one of the wheel brackets so as to stop the wheel bracket as the corresponding ear abuts the limit tab.

11. The handcart as claimed in claim 9, wherein a sleeve is mounted on each pivot pin and has two ends each abutting the ear closest to the lever and one end of the pivot bracket so as to separate the ear from the end of the pivot bracket.

* * * * *